Nov. 11, 1924. 1,515,575

M. W. GELETTE

GEAR SHIFTING APPARATUS

Filed Jan. 16, 1924 4 Sheets-Sheet 2

M.W. Gelette
INVENTOR
BY *Victor J. Evans*
ATTORNEY

WITNESS:
L. B. James.

Nov. 11, 1924.

M. W. GELETTE 1,515,575

GEAR SHIFTING APPARATUS

Filed Jan. 16, 1924    4 Sheets-Sheet 3

WITNESS: L. B. James

M. W. Gelette
INVENTOR

BY Victor J. Evans
ATTORNEY

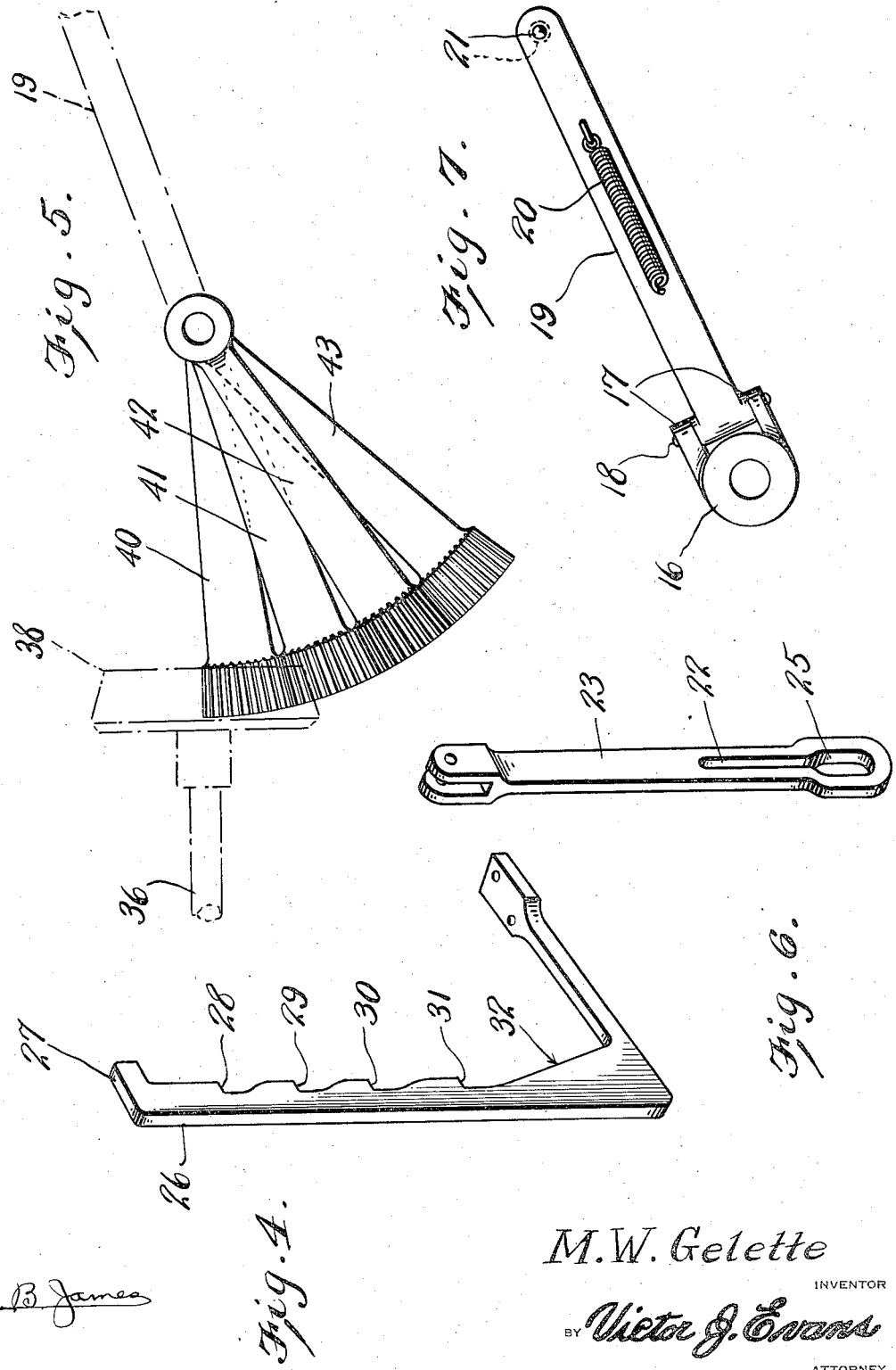

Patented Nov. 11, 1924.

1,515,575

UNITED STATES PATENT OFFICE.

MARSHALL W. GELETTE, OF NEW BEDFORD, MASSACHUSETTS.

GEAR-SHIFTING APPARATUS.

Application filed January 16, 1924. Serial No. 686,666.

*To all whom it may concern:*

Be it known that I, MARSHALL W. GE-LETTE, a citizen of the United States, residing at New Bedford, in the county of Bristol and State of Massachusetts, have invented new and useful Improvements in Gear-Shifting Apparatus, of which the following is a specification.

This invention relates to transmission mechanism for automobiles, trucks and the like, and has for its object the provision of novel means operable by movement of the clutch pedal for shifting the gears in the transmission whereby the eliminate use of the well known and commonly provided gear shift lever, the advantage being that the operator may keep both hands on the steering wheel at all times.

An important object is the provision of a mechanism of this character which will be comparatively simple and inexpensive in manufacture, and installation, positive in action, efficient and durable in service and a general improvement in the art.

Figure 1:
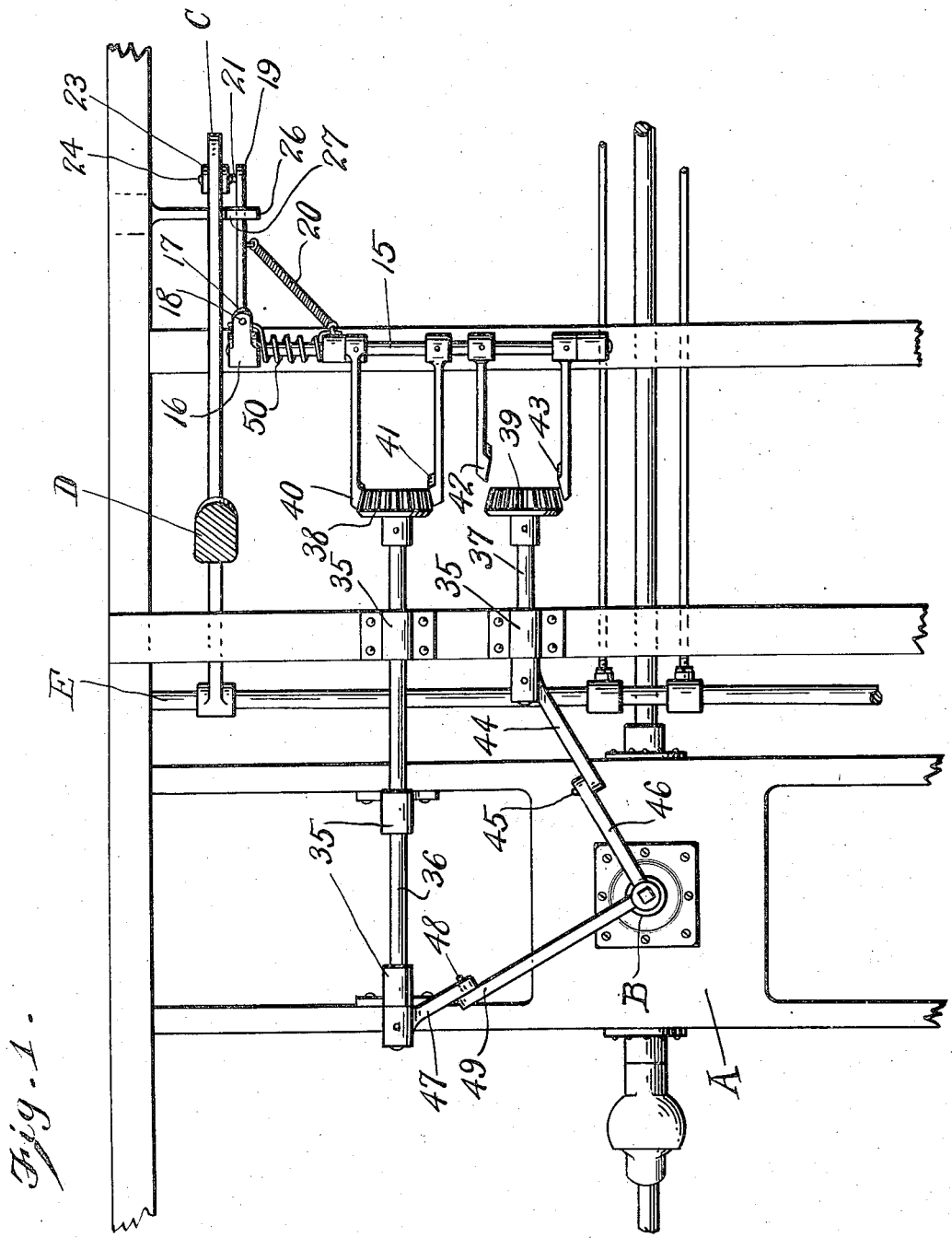
Figure 2:
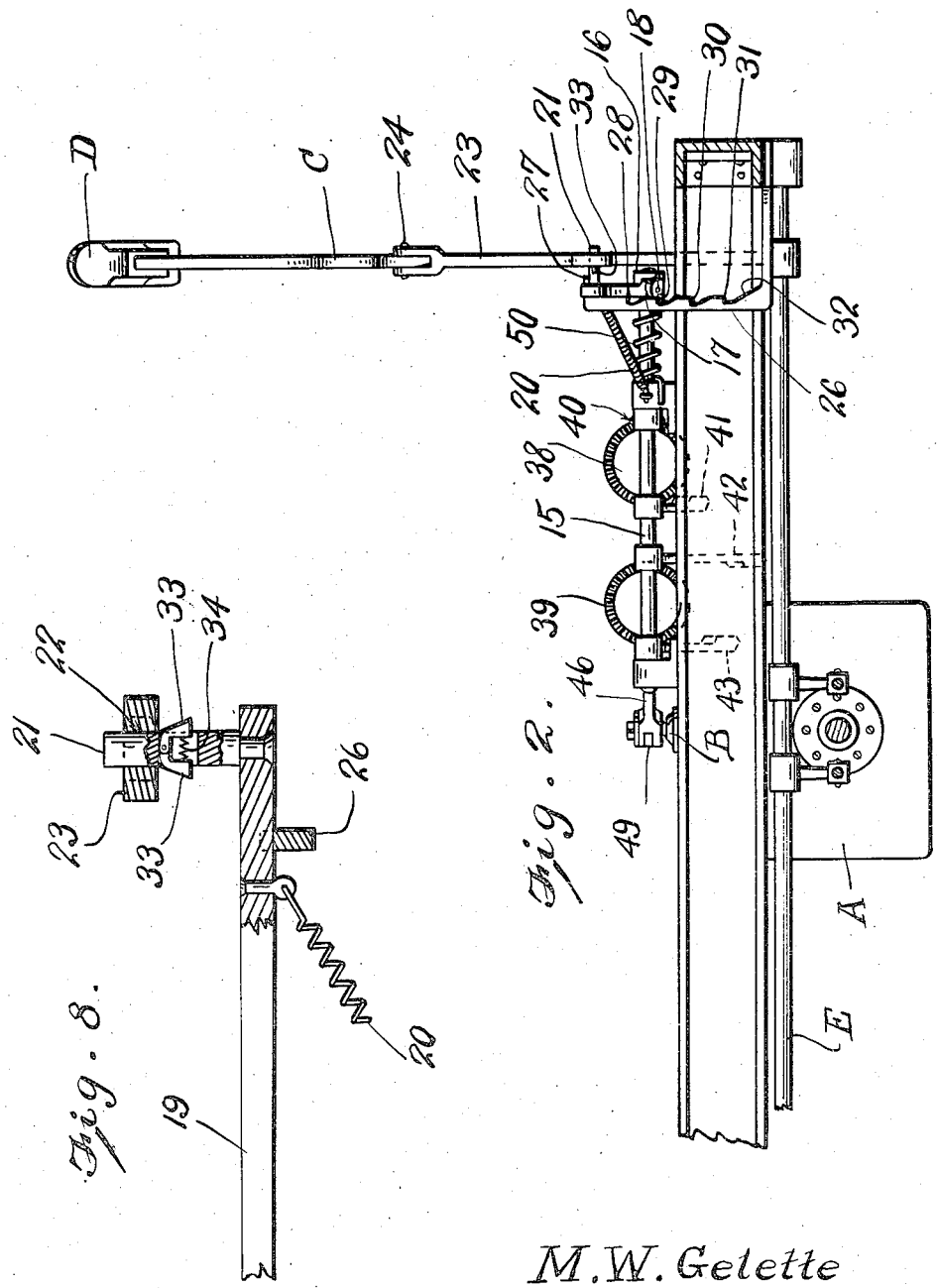
Figure 3:
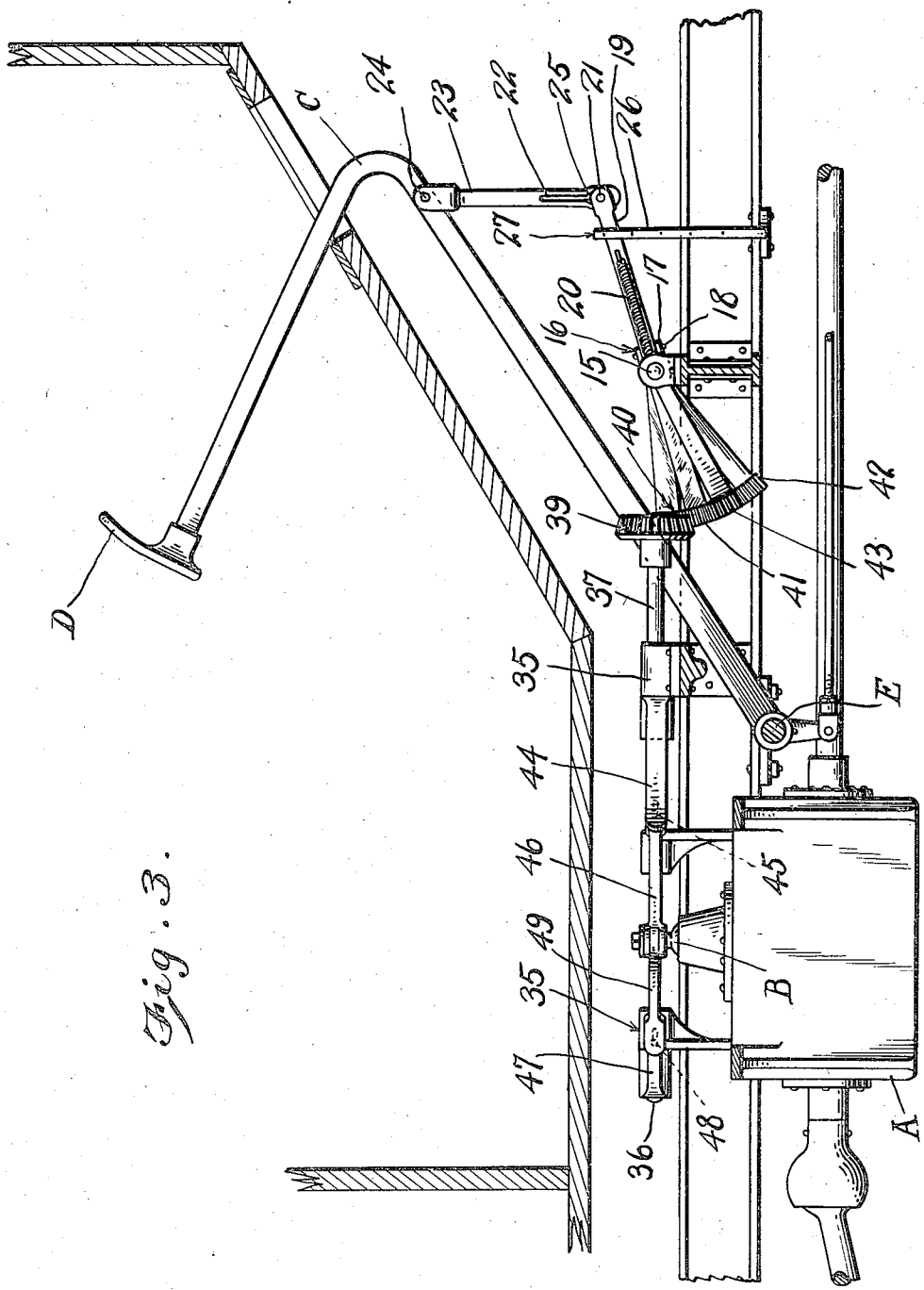

With the above and other objects and advantages in view the invention consists in the details of construction to be hereinafter more fully described and claimed and illustrated in the accompanying drawings, in which:

Figure 1 is a view in plan looking toward the gear box of an automobile transmission and showing my invention applied, Figure 2 is a sectional view through the automobile chassis showing an end elevation of the device, Figure 3 is a longitudinal section through the chassis showing a side elevation of the device, Figure 4 is a detail view of the retaining member, Figure 5 is a detail view illustrating the relative positions of the segmental gears, Figure 6 is a detail perspective view of one of the bar elements of the mechanism, Figure 7 is a detail side elevation of a spring pressed arm forming part of the apparatus, Figure 8 is a fragmentary view of the arm, a portion being in elevation, and the remaining portion being in section.

Referring more particularly to the drawings the letter A designates the gear box of an automobile transmission, and B represents the ball and socket member thereon which is movable to effect shifting of the gears. The gears themselves are not illustrated as they form no part of the present invention and in the present instance, the device is shown and described in association with a transmission having a standard gear shift, though it should be understood in advance that the directions of movement and relation of the parts may be changed to render the device capable of use in connection with gear shifts of other than standard arrangement. The letter C indicates the shank of the clutch pedal D, which pedal is mounted on a supporting shaft E in the usual manner. The clutch mechanism is likewise not illustrated as it forms no part of the present invention.

In carrying out my invention I provide a shaft 15 mounted in suitable bearings supported from the frame of the vehicle, and carrying a hub 16 on which are ears 17 between which is pivoted, at 18, an arm 19 normally pulled in one direction by a spring 20. This arm carries a laterally extending pin 21 which rides along a slot 22 formed in an elongated bar 23 pivoted at 24 upon and depending from the pedal shank C. One end of the slot 22 merges into a relatively large opening 25 for a purpose to be described.

Suitably mounted upon the frame of the car is an upstanding bracket 26 which is formed at its upper end with a stop shoulder 27 and which is formed in one edge with notches 28, 29, 30 and 31 corresponding to the first, second, third and reverse positions of the gear shifting means within the box A. Each notch has a square shoulder and an inclined surface as clearly shown in Figure 4, and leading from the lowermost notch 31 is a relatively long inclined surface 32.

It should be stated that the pin 21 carries a pair of latches 33 which are urged outwardly by springs 34 suitably housed within the pin as in a recess, slot or the like.

Mounted in suitable bearings 35, are shafts 36 and 37 arranged at right angles to the shafts 15 and E and carrying beveled gears 38 and 39 respectively. On the shaft 15 are four segmental gears 40, 41, 42 and 43, the first two of which are associated with the gear 38 and the latter two of which are associated with the gear 39. These segmental gears are all arranged at different angles or positions with respect to the beveled gears so that when the shaft 15 is rotated to different extents, the successive segmental gears may be brought into mesh with the gears 38 and 39 as the case may be.

The shaft 37 carries an arm 44 having a pivotal connection 45 with an arm 46 connected with the joint B, and the shaft 36 carries an arm 47 having a pivotal connection 48 with an arm 49 likewise connected with the joint B.

In the operation, when the clutch pedal D is moved forwardly and downwardly in the usual manner, the first slight movement disengages the clutch as is well known. When the pedal is moved downwardly to a slightly greater extent, the engagement of the end of the slot 22 with the pin 21 moves the arm 19 downwardly, and when this arm reaches the first notch 28, the spring 20 will bring it into the notch. As this movement is going on, the segmental gear 40 meshes with the gear 38 and turns the shaft 36, and consequently the arm 47, so that the arm or link 49 will pull the joint B and gear shifting member thereon within the box A into such position that the proper gears are in mesh to place the transmission in first or low gear. When pressure on the pedal is released, the pedal returns to normal position so that the clutch is engaged, while the arm 19 still remains in engagement with the notch 28.

To shift into second gear, the operator again presses the pedal D, but to a greater extent than in the first place, and the result will be that the downward movement of the bracket 23 carried by the pedal shank will cause the upper end of the slot 22 to re-engage the pin 21 and swing the arm 19 downwardly out of the first notch 28 into the second notch 29. As this additional movement occurs, the segmental gear 41 comes into mesh with the gear 38 as the gear 40 moves out of mesh, and the result is that the gear 38 is additionally rotated. The resultant movement of the shaft 36 and arm 47 carried thereby causes the member 49 to move the gear shift element into the second or intermediate gear position. When pressure on the pedal is relieved it again returns to normal position, so that the clutch is re-engaged, while the arm 19 is left in the notch 29.

To throw the mechanism into high gear, the operator presses the pedal a third time, whereupon the bracket 23 again moves downwardly until the upper end of the slot 22 re-engages the pin 21 so that the arm 19 will be carried out of the notch 29 into the notch 30. At the same time, the segmental gear 43 meshes with the gear 39 and turns the shaft 37 so that the arm 44 thereon will swing the member 46 and pull the gear shifting element into such position that the high speed gears are in mesh. When pressure on the pedal is again relieved it returns to normal position with the arm 19 remaining in the notch 30. It should be stated that a spring 50 is provided surrounding the shaft and having one end secured thereto and its other end secured to some stationary support. The purpose of the spring is to return the shaft to normal position when the pedal is operated properly for accomplishing this.

After the pedal has been once pressed, shaft 15 cannot return to initial position until the pedal has been pushed down far enough to cause the latches on part 21 to be forced through the slot on part 23. This is caused by part 19 being forced to the left by being forced down the inclined surface 32. Latches 33 now prevent 19 from becoming engaged in the notches until the pedal has returned to normal position at which time only latches 33 can slip through 25. Once 19 has become engaged in a notch it can be released only by the above process, namely, by pushing pedal far enough down the incline 32 to force the latches through the slot in 23, and 19 is released from being held to the left only when the pedal returns to normal position.

To reverse the car, the same operation is gone through with but the clutch pedal is pushed downwardly to a still greater extent whereupon the arm 19 is moved, as above described, into the notch 31, while the gear 42 meshes with the gear 39 and turns it so that the arms 44 and 46 will move the gear shifting element into such position that the reverse gears in the box A will be in mesh. Whenever the pedal is pushed all the way down and subsequently released, the wider end or opening 25 of the slot 22 comes opposite the latch members 33 and the spring 20 pulling upon the arm 19 causes it to be drawn through the slot, the latches 33 passing through the wider end so that the parts may return to normal or initial position.

From the foregoing description and a study of the drawings it will be apparent that I have thus provided a very simple and easily installed and operated gear shift mechanism which is controlled entirely by the clutch pedal and which consequently eliminates use of the gear shift hand lever so that the operator may keep both hands on the steering wheel. Naturally this is an advantageous feature inasmuch as likelihood of accident is reduced.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. In combination with the gear shift element and cluch pedal of a motor vehicle transmission, arm members connected with said element, rotatable shafts operatively connected with said arms, a shaft operatively connected with the clutch pedal whereby to be moved thereby and means between said last and first named shafts for rotating the former to a limited extent.

2. In combination with the clutch pedal and gear shift element of a motor vehicle transmission, gear shifting means operatively connected with the pedal, and comprising a pair of shafts carrying gears and further carrying arms connected with the shifting element, a shaft carrying segmental gears adapted to mesh with said first named gears, and means connected with the clutch pedal and said last named shaft for rotating the latter through a predetermined arc.

3. In combination with the clutch pedal and gear shift element of a motor vehicle transmission, gear shifting means operatively connected with the pedal, and comprising a pair of shafts carrying gears and further carrying arms connected with the shifting element, a shaft carrying segmental gears adapted to mesh with said first named gears, and means connected with the clutch pedal and said last named shaft for rotating the latter through a predetermined arc, and means for returning the last named shaft to original position.

4. In combination with the clutch pedal and gear shift element of a motor vehicle transmission, gear shifting means operatively connected with the pedal, and comprising a pair of shafts carrying gears and further carrying arms connected with the shifting element, a shaft carrying segmental gears adapted to mesh with said first named gears, and means connected with the clutch pedal and said last named shaft for rotating the latter through a predetermined arc, and stop means for retaining the parts in shifted position.

5. In combination with the clutch pedal and gear shift element of a motor vehicle transmission, gear shifting means operatively connected with the pedal, and comprising a pair of shafts carrying gears and further carrying arms connected with the shifting element, a shaft carrying segmental gears adapted to mesh with said first named gears, and means connected with the clutch pedal and said last named shaft for rotating the latter through a predetermined arc, and stop means for retaining the parts in shifted position and means for effecting release of the retaining means.

In testimony whereof I affix my signature.

MARSHALL W. GELETTE.